(12) United States Patent
Eagar et al.

(10) Patent No.: US 6,504,351 B2
(45) Date of Patent: Jan. 7, 2003

(54) SYSTEMS AND METHODS FOR CONTROLLING THE CHARGE PROFILE DURING THE COMMUTATION EVENT OF A SYNCHRONOUS SWITCHING TRANSISTOR IN A REGULATOR

(75) Inventors: Dale R. Eagar, Black Forest, CO (US); John L. Seago, San Jose, CA (US)

(73) Assignee: Linear Technology Corporation, Milpitas, CA (US)

(*) Notice: Subject to any disclaimer, the term of this patent is extended or adjusted under 35 U.S.C. 154(b) by 0 days.

(21) Appl. No.: 09/789,960

(22) Filed: Feb. 20, 2001

(65) Prior Publication Data

US 2002/0113581 A1 Aug. 22, 2002

(51) Int. Cl.[7] .................................................. G05F 1/40
(52) U.S. Cl. ..................................................... 323/282
(58) Field of Search ................................ 323/282, 284, 323/285

(56) References Cited

U.S. PATENT DOCUMENTS

| | | | |
|---|---|---|---|
| 3,582,758 A | 6/1971 | Gunn | 321/47 |
| 3,652,874 A | 3/1972 | Partridge | |
| 4,395,675 A | * 7/1983 | Toumani | 323/271 |
| 4,578,630 A | 3/1986 | Grosch | 323/271 |
| 4,754,385 A | * 6/1988 | McDade et al. | 363/16 |
| 4,931,716 A | 6/1990 | Jovanovic et al. | 323/285 |
| 5,097,196 A | 3/1992 | Schoneman | 323/222 |
| 5,365,188 A | 11/1994 | Wilcox | 327/109 |
| 5,408,150 A | 4/1995 | Wilcox | 327/108 |
| 5,481,178 A | * 1/1996 | Wilcox et al. | 323/287 |
| 5,912,552 A | * 6/1999 | Tateishi | 323/285 |

OTHER PUBLICATIONS

"Step–Down Switching Regulator," LT1074/LT1076 Data Sheet, 1994, vol. III, pp. 4–243–256.
"High Efficiency Switching Regulators," LT1170/LT1171/LT1172 Data Sheet, 1994, vol. III, pp. 4–433–446.

* cited by examiner

Primary Examiner—Adolf Deneke Berhane
(74) Attorney, Agent, or Firm—Robert W. Morris; Jeffrey D. Mullen; Fish & Neave (57) ABSTRACT

The present invention provide systems and methods for reducing a reverse recovery current through a body diode in a synchronous switching transistor. An inductor is coupled in the commutation path of the body diode of the synchronous switching transistor. The inductor slows the rate of increase of the reverse recovery current to reduce avalanche effects in the synchronous switching transistor. This reduces the peak reverse recovery current through the body diode of the synchronous switching transistor when the body diode commutates, thereby reducing power dissipation in the main switching transistor. An inductor may be coupled to both switching transistors so that power dissipation is reduced if the regulator is operated as a buck or boost regulator. A diode and a reverse recovery switcher may be coupled to the inductor to transfer energy in the inductor back to the input or output capacitor after the body diode commutates.

37 Claims, 5 Drawing Sheets

SYSTEMS AND METHODS FOR CONTROLLING THE CHARGE PROFILE DURING THE COMMUTATION EVENT OF A SYNCHRONOUS SWITCHING TRANSISTOR IN A REGULATOR

BACKGROUND OF THE INVENTION

The field of this invention relates to reducing power dissipation in a synchronous switching regulator. More specifically, this invention relates to systems and methods for controlling the charge profile remaining in the body diode of a synchronous switching transistor at the time of its forced commutation by the main switching transistor.

A synchronous switching regulator includes two switching transistors that are switched ON and OFF out of phase with one another by a control circuit. The switching transistors include a main switching transistor and a synchronous switching transistor. When the synchronous switching transistor is turned OFF in each cycle, the channel current of the synchronous switching transistor moves into its body diode. A short time later, the main switching transistor turns ON, and a reverse recovery current flows through both switching transistors. The reverse recovery current increases rapidly to a large value causing substantial power dissipation, because the body diode of the synchronous switching transistor has not yet commutated.

It would therefore be desirable to provide a synchronous switching regulator that reduces the rate of rise in the reverse recovery current and the maximum current in both switching transistors at the time of commutation of the body diode of the synchronous switching transistor.

It would also be desirable to provide a synchronous switching regulator that reduces power dissipation by controlling the profile of the charge remaining in the body diode of a synchronous switching transistor at the time of its forced commutation by the main switching transistor.

It would also be desirable to provide a synchronous switching regulator that reduces power dissipation in the switching transistors whether it is operated as a buck or a boost regulator.

SUMMARY OF THE INVENTION

It is an object of the present invention to provide a synchronous switching regulator that reduces the rate of rise in the reverse recovery current and the maximum current in both switching transistors at the time of commutation of the body diode of the synchronous switching transistor.

It also is an object of the present invention to provide a synchronous switching regulator that reduces power dissipation by controlling the profile of the charge system remaining in the body diode of a synchronous switching transistor at the time of its forced commutation by the main switching transistor.

It is also an object of the present invention to provide a synchronous switching regulator that reduces power dissipation in the switching transistors whether it is operated as a buck or a boost regulator.

The present invention provides systems and methods for controlling the current through body diodes of switching transistors. Switching regulators of the present invention include an inductor that is coupled in the commutation path of the body diode of the synchronous switching transistor. The inductor controls the charge profile of the body diode of the synchronous switching transistor at the time the body diode commutates to reduce power dissipation by slowing down the rate of rise in the reverse recovery current. The inductor reduces the maximum reverse recovery current through both switching transistors reducing power dissipation, especially in the main switching transistor.

Switching regulators of the present invention that may be used as buck or boost include two inductors that are coupled to each of the switching transistors. The first inductor reduces power dissipation in one switching transistor when the regulator is operated as buck regulator. The second inductor reduces power dissipation in the other switching transistor when the regulator is operated as a boost regulator. A diode and a recovery switcher may be used in the present invention so that the energy stored in the inductor may be dissipated when the body diode turns OFF.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF PREFERRED EMBODIMENTS

Figure 1:
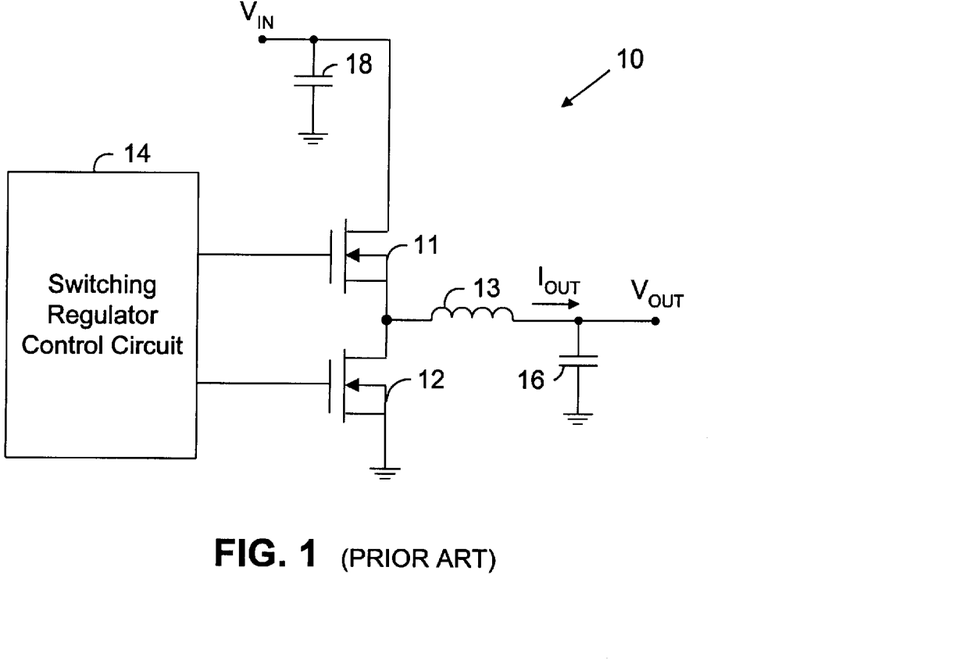
FIG. 1 is a schematic of a prior art buck synchronous switching regulator.

A previously known synchronous switching regulator 10 is shown in FIG. 1. Switching regulator 10 includes n-channel main switching MOSFET 11, synchronous switching MOSFET 12, main inductor 13, capacitor 16 at $V_{OUT}$, capacitor 18 at $V_{IN}$, and switching regulator control circuit 14. Switching regulator 10 is configured as a step-down or buck converter. Output current $I_{OUT}$ of regulator 10 flows from $V_{IN}$ to $V_{OUT}$ through inductor 13. Control circuit 14 synchronously switches switching transistors 11 and 12 out of phase with each other.

Dead times may be included in each switching cycle between the time that one switching transistor turns OFF and the other switching transistor turns ON. During a dead time, both switching transistors are OFF. For example, after synchronous switching transistor 12 turns OFF, a dead time elapses before main switching transistor 11 turns ON. This time interval is a dead time. The body diode of transistor 12 conducts forward current during this dead time. When main transistor 11 turns ON, forward current still flows in the body diode of transistor 12. Therefore, the body diode of transistor 12 is not commutated. A diode is commutated when the diode blocks reverse current flowing through it up to the diode's breakdown voltage. Because the body diode of transistor 12 is not commutated when transistor 11 turns ON, a large reverse recovery current begins to flow from $V_{IN}$ through transistor 11 and the body diode of transistor 12 to ground.

This large reverse recovery current causes several problems. First, it causes heat buildup in main transistor 11, as a result of the resistive characteristics of its channel, and unwanted power dissipation. Second, charge carriers in the body diode of synchronous switching transistor 12 become locally depleted. This localized depletion of charge in the body diode of transistor 12 causes the body diode to stop conducting reverse recovery current relatively early. When this happens, the charge distribution in the body diode of transistor 12 is not favorable to the body diode being able to prevent further reverse current from flowing through it under a large reverse voltage. Therefore, the body diode is only conditionally commutated.

When the body diode stops conducting reverse recovery current, the reverse voltage across the body diode rises quickly to the point that charge carriers start avalanching across the region of localized depletion previously discussed. The large reverse recovery current that earlier flowed through the body diode before it stopped conducting reverse current fuels the rapid rate of increase in the reverse voltage across the body diode. Subsequent to the reverse voltage across the body diode increasing sufficiently, the avalanche effects cause a large current pulse through the body diode and generate many unwanted charge carriers. This large current pulse causes additional unwanted power dissipation in main transistor 11. The unwanted charge carriers contribute to heating in transistors 11 and 12 and cause beta multiplication in the parasitic bipolar junction transistor of transistor 12, both of which cause further unwanted power dissipation.

Figure 2:
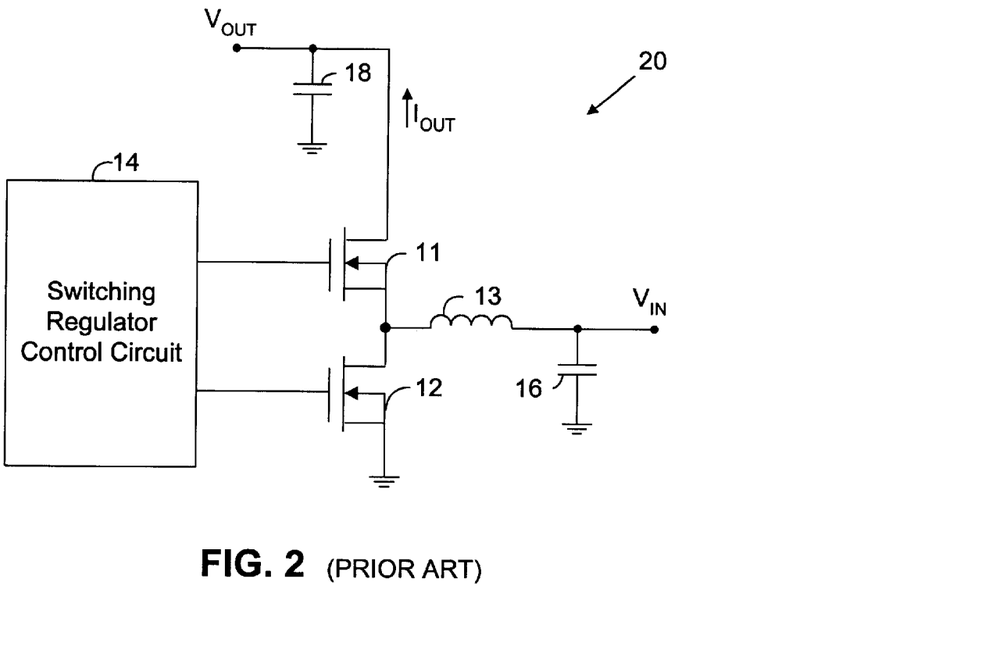
FIG. 2 is a schematic of a prior art boost synchronous switching regulator.

Switching regulator 20 shown in FIG. 2 has the same circuitry of regulator 10, except that $V_{IN}$ and $V_{OUT}$ are reversed. Output current $I_{OUT}$ of regulator 20 flows from $V_{IN}$ to capacitor 18 at $V_{OUT}$ through inductor 13. Switching regulator 20 is configured as a step-up or boost converter. When switching transistor 11 turns OFF, forward current continues to flow through a body diode in transistor 11 to capacitor 18. After transistor 12 turns ON, reverse recovery current flows through transistors 11 and 12 to ground. Avalanche effects may occur in transistor 11 increasing unwanted power dissipation as discussed above with respect to FIG. 1.

Figure 3:
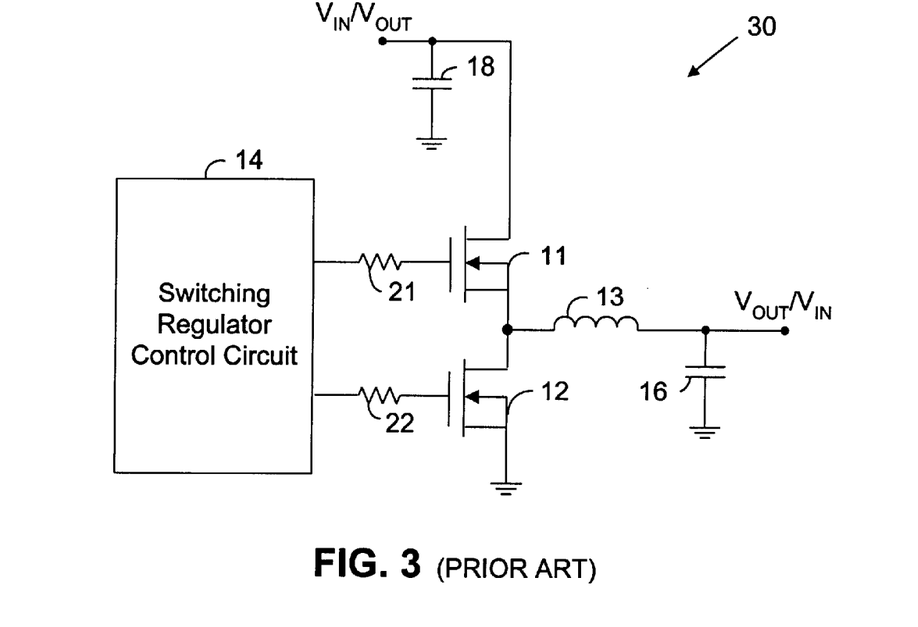
FIG. 3 is a schematic of another prior art synchronous switching regulator.

A previously known method for reducing the undesirable effects of large reverse recovery currents is shown as synchronous switching regulator 30 in FIG. 3. Regulator 30 may be used as a buck or boost regulator. Regulator 30 is formed by coupling resistors 21 and 22 to the gates of transistors 11 and 12. Resistors 21 and 22 slow down the rate at which transistors 11 and 12 turn ON. Resistors 21 and 22 also slow down the rate of current rise in the body diode commutation path. However, resistors 21 and 22 may slow down the turning ON of transistors 11 and 12 enough to cause shoot-through problems.

Figure 4:
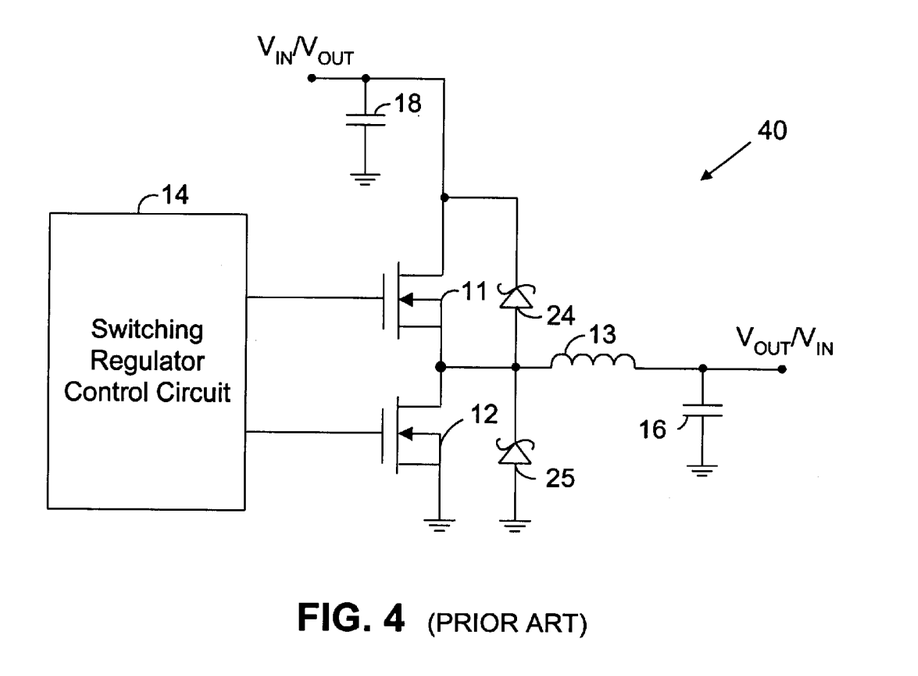
FIG. 4 is a schematic of another prior art synchronous switching regulator.

Another previously known for reducing the undesirable effects of large reverse recovery currents is shown as synchronous switching regulator 40 in FIG. 4. Regulator 40 which may be operated as a buck or boost regulator, includes schottky diodes 24 and 25 coupled in parallel with the body diodes of transistors 11 and 12 in regulator 40. Diodes 24 and 25 reduce some of the power dissipation associated with the reverse recover current by conducting a portion of the current. However, the power saving is negligible, because only about 10% of the current flows into the schottky diodes.

Switching regulators of the present invention reduce the rate of increase in the reverse recovery current by coupling an inductor in the commutation path of the body diode of the synchronous switching transistor. The inductor causes charge carriers in the synchronous switching transistor to redistribute evenly to reduce local charge carrier depletion. The reverse recovery current and the power dissipation it causes are substantially reduced. An inductor may be coupled to each switching transistor in a synchronous switching regulator so that power saving occurs if the switching regulator is used as a buck or boost regulator. A diode and recovery switcher may be added to switching regulators of the present invention to recover the energy intercepted by the inductor when the body diode turns OFF.

Figure 5A:
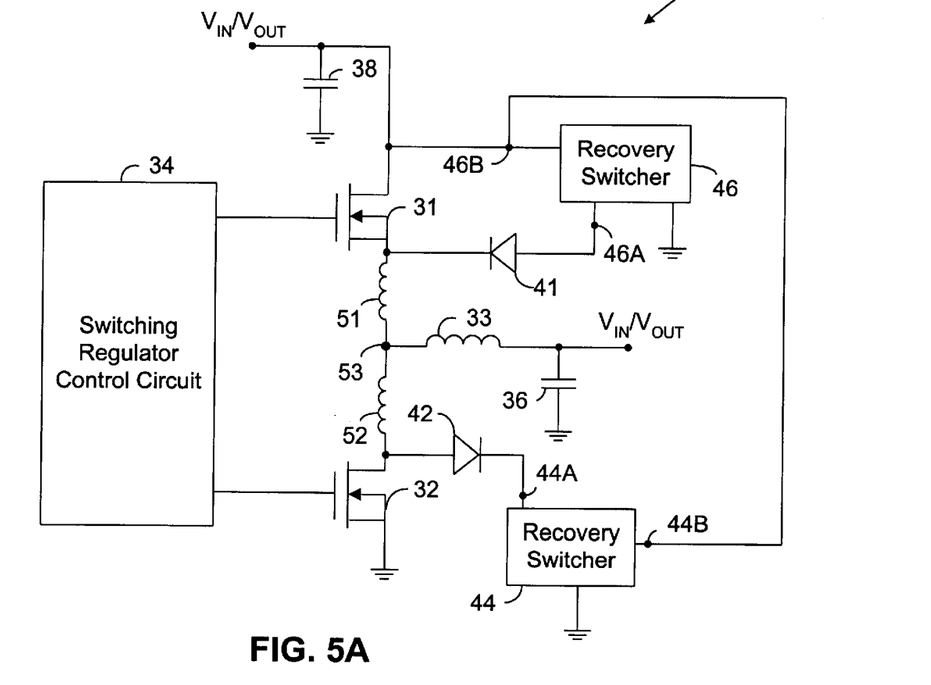
FIG. 5A is a schematic of an illustrative embodiment of a synchronous switching regulator in accordance with the principles of the present invention.

Switching regulator 50 in FIG. 5A is a simplified embodiment of the present invention. Switching regulator 50 includes n-channel MOSFET switching transistors 31 and 32, capacitors 36 and 38, main inductor 33, diodes 41 and 42, inductors 51 and 52, recovery switchers 44 and 46, and switching regulator control circuit 34. Main inductor 33 stores energy that is transferred from the input capacitor to the output capacitor. Switching transistors 31 and 32 are synchronously switched out of phase with each other by control circuit 34 so that when one is ON, the other is OFF. Switching transistors 31 and 32 are coupled together between capacitor 38 and ground. In the present application, two circuit elements may be coupled together, even if the two circuit elements are not directly connected together. For example, inductor 33 is coupled to transistor 31 through inductor 51, and inductor 33 is coupled to transistor 32 through inductor 52.

Control circuit 34 may be any suitable synchronous switching regulator control circuit. For example, control circuit 34 may be a voltage mode or current mode regulator with feedback loop circuitry such as a resistor divider (not shown) coupled to $V_{OUT}$, and either constant off-time or constant on-time with a variable frequency, or pulse width modulation with constant frequency control of the duty cycle of the switching transistors. If control circuit 34 has current mode control, a sense resistor may, for example, be coupled between inductor 33 and capacitor 36, between transistor 31 and capacitor 38, or between transistor 32 and ground. A current comparator in circuit 34 monitors the current through the sense resistor in a current mode controller. Other current sense mechanisms are also commonly used. Control circuit 34 contains drivers to switch transistors 31 and 32 ON and OFF.

Switching regulator 50 may be used as a buck regulator in which $V_{IN}$ is greater than $V_{OUT}$, or a boost regulator in which $V_{IN}$ is less than $V_{OUT}$. Regulator 50 is a buck switching regulator if $V_{IN}$ is coupled to capacitor 38 and $V_{OUT}$ is coupled to capacitor 36. Regulator 30 is a boost regulator if $V_{IN}$ is coupled to capacitor 36 and $V_{OUT}$ is coupled to capacitor 38. When a MOSFET transistor is ON (such as MOSFETs 31 and 32), current may flow between the source and the drain of that transistor. When the MOSFET turns OFF, current may flow in the body diode of the transistor. The source and body of n-channel transistors 31 and 32 are coupled together as shown in FIG. 5A. Therefore, the body diode in each of transistors 31 and 32 comprises the n-type drain to p-type body PN junction. If the MOSFET is OFF and its drain-to-body PN junction is forward biased, current may flow in its body diode.

Current may flow in the body diode of transistor 31 when regulator 50 is operated as a boost regulator. Current may flow in the body diode of transistor 32 when regulator 50 is operated as a buck regulator. A reverse recovery current causes the body diode to commutate. As the reverse recovery current increases, the power dissipated in regulator 50 (especially in the main switching transistor) also increases. Inductors 51 and 52 in regulator 50 substantially reduce the peak reverse recovery current to reduce power dissipation, as is now described. Inductors 51 and 52 may alternatively comprise windings in a transformer or choke coil.

When switching transistor 31 is ON, current flows through switching transistor 31 and inductors 51 and 33. When switching transistor 32 is ON, current flows through switching transistor 32 and inductors 52 and 33. These current paths exist whether regulator 50 is configured to operate as a buck or as a boost circuit. The inductance of inductor 33 may be in the range of 75–300 times the inductance of inductor 51, for example. The inductance ratio of inductor 52 to inductor 33 may have a similar value. These inductance ratios are illustrative values, and other ratios may be used if desired.

The following discussion applies to switching regulator 50 configured as a buck regulator where capacitor 36 is coupled to $V_{OUT}$ and capacitor 38 is coupled to $V_{IN}$. Assume that switching transistor 31 is OFF, switching transistor 32 is ON, and current flows from ground through transistor 32 and inductors 52 and 33 to $V_{OUT}$. Subsequently, switching transistor 32 is turned OFF. There may be a brief dead time introduced by circuitry within control circuit 34 when both switching transistors are OFF before transistor 31 turns ON to prevent cross conduction through transistors 31 and 32. During this dead time, current flows from ground through the body diode of transistor 32 and inductor 52 to inductor 33.

When the dead time ends, transistor 31 turns ON and current now flows from $V_{IN}$ at capacitor 38 through transistor 31 and inductor 51. The inductance of inductor 51 and the magnitude of the voltage on capacitor 38 determine the rate of current rise in transistor 31 (according to the equation: di/dt=V/L).

The current through inductor 51 increases after transistor 31 turns ON. When the current through inductor 51 rises to the point that it equals the current through main inductor 33, the current through inductor 52 equals zero. After this point, the voltage at node 53 rises. However, the body diode of transistor 32 is not commutated at this time and does not block reverse current flow.

The voltage between node 53 and ground is imposed across inductor 52. The voltage at node 53 is now positive and the direction of current in the body diode of transistor 32 has reversed. Reverse recovery current (i.e., from $V_{IN}$ to ground) flows through transistor 31, inductors 51 and 52, and the body diode of transistor 32. The reverse recovery current removes charge carriers from transistor 32 so that its body diode commutates. The inductance of inductors 51 and 52 controls the rate of increase of reverse recovery current in transistor 32. Inductors 51 and 52 reduce the rate of increase in the reverse recovery current so that carriers exit transistor 32 evenly. This reduces localized depletion of carriers in transistor 32 and the undesirable avalanche effects that may result from it. The inductance value of inductor 52 is selected so that the charge carrier distribution within the transistor 32 body diode is redistributed in a way that reduces avalanche effects.

As the reverse recovery current in inductor 52 increases, minority carriers in the body diode PN junction depletion region of transistor 32 are removed, and the depletion region widens. Eventually, the body diode of transistor 32 commutates and blocks reverse current flow. By reducing the rate of increase in the reverse recovery current, the charge profile of transistor 32 redistributes in such a way that the body diode of transistor 32 commutates at a lower reverse recovery current. Thus, inductor 52 significantly reduces the peak reverse recovery current associated with the commutation of the body diode of transistor 32, which substantially reduces the power dissipated by transistor 31. The overall efficiency of regulator 50 increases as a result of inductor 52.

Current continues to flow in inductor 52 after the body diode of transistor 32 commutates. Once the body diode commutates, the current in inductor 52 is redirected through diode 42 into recovery switcher 44. Diode 42 provides a path for the energy in inductor 52 to recovery switcher 44. Recovery switcher 44 is a switching regulator that transfers the energy from inductor 52 back to $V_{IN}$ at capacitor 38 causing further power saving and higher efficiency.

Recovery switcher 44 has an input terminal 44A coupled to diode 42 and an output terminal 44B coupled to capacitor 38. Capacitor 38 is coupled to the input voltage source of regulator 50 in a buck embodiment. Recovery switcher 44 has a low input impedance at terminal 44A and a high output impedance at terminal 44B. Recovery switcher 44 regulates its input voltage at the cathode of diode 42 to a value higher than the voltage on capacitor 38, but does not regulate its output voltage at capacitor 38. The voltage at capacitor 38 is determined by the input voltage source of regulator 50. When the current through inductor 52 ramps down to zero, diode 42 commutates.

Figure 5B:
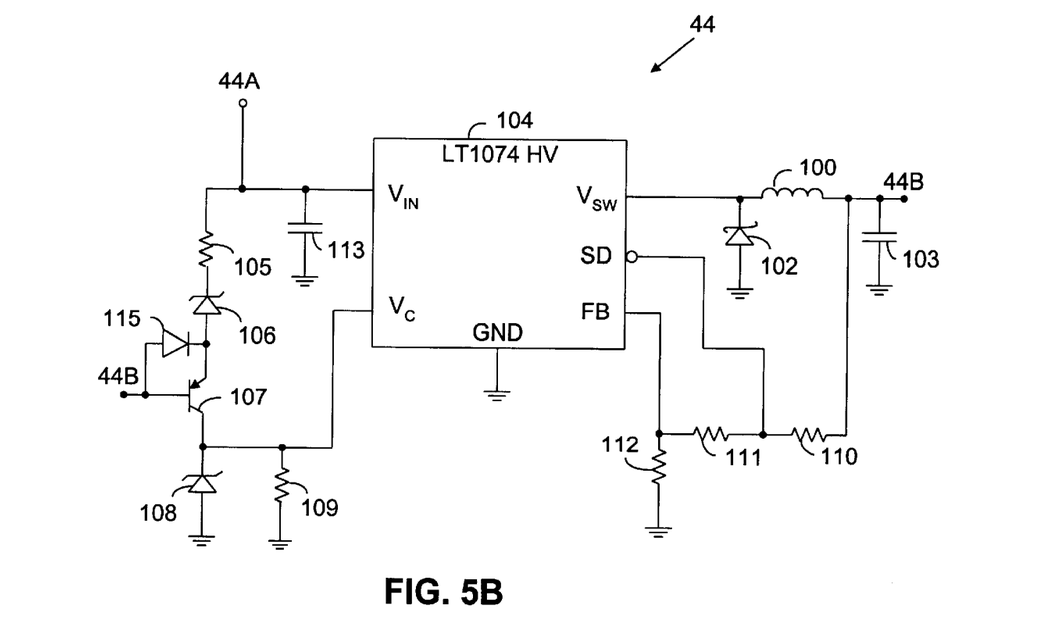
FIG. 5B is a schematic of an illustrative embodiment of a recovery switcher in accordance with the principles of the present invention.

Recovery switcher 44 may comprise one of many different topologies. An example is shown in FIG. 5B, wherein a high voltage LT1074 switching regulator circuit is configured to act as a recovery switcher. Details of the LT1074 circuit are shown and discussed in the 1994 LT1074 datasheet, which is hereby incorporated by reference herein in its entirety. The LT1074 control circuit 104 is a non-synchronous switching regulator circuit. Current flows from terminal 44A through a switching transistor and inductor 100 to terminal 44B. An internal switching transistor coupled between the $V_{IN}$ and $V_{SW}$ pins of the LT1074 is turned ON and OFF by PWM (pulse-width modulation) control circuitry. The PWM control circuitry is controlled by the voltage on the $V_c$ and the FB pins of control circuit 104.

Recovery switcher 44 includes resistors 105, 109, 110, 111, and 112, schottky diode 102, capacitor 113, transistor 107, zener diodes 106 and 108, diode 115, inductor 100, capacitor 103, and switching regulator 104. Example component and voltage values are now provided. Terminal 44A may be at 52 volts when diode 42 conducts, and terminal 44B may be at 42 volts. The breakdown voltage of diode 106 may be 7 volts, the breakdown voltage of diode 108 may be 5.6 volts, resistors 105 and 109 may be 2.2 kΩ, resistor 110 may be 100 kΩ, resistor 111 may be 3 kΩ, and resistor 112 10 kΩ.

The LT-1074 includes an internal error amplifier coupled between the FB pin and the $V_c$ pin. The input of the error amplifier is coupled to the FB pin. The FB pin is coupled to terminal 44B through resistors 110 and 111 so that the frequency shifting feature of the LT1074 is disabled, and the switching frequency of the switching transistor remains constant. The SD pin is coupled to terminal 44B through resistor 110 so that the shutdown feature is disabled.

The output of the error amplifier in circuit 104 is coupled to the $V_c$ pin. The average inductor current through inductor 100 is determined by the inductance of inductor 100 and the duty cycle of the internal switching transistor. PWM circuitry inside regulator 104 determines the duty cycle of the internal switching transistor by monitoring the voltage at the $V_c$ pin. When the voltage difference between terminals 44A and 44B is less than a threshold voltage (8 volts using the above example values), BJT 107 is OFF, the voltage at the $V_c$ PIN is about zero, and circuit 104 outputs zero current through inductor 100 to terminal 44B.

When diode 42 of FIG. 5A conducts forward current, the voltage at terminal 44A rises above the threshold voltage, and PNP bipolar junction (BJT) transistor 107 turns ON. Current now flows from terminal 44A through resistor 105, zener diode 106, transistor 107, zener diode 108, and resistor 109 to ground, and the voltage at the $V_c$ pin, which is determined by the current through these circuit elements, rises. The LT1074 senses the rise in the voltage at the $V_c$ pin and increases the average current in inductor 100 above zero. Thus, recovery switcher 44 supplies output current to input capacitor 38 when diode 42 conducts forward current. The ratio of resistors 105 and 109, the transfer function of the LT1074, and the value of inductor 100 all determine the average inductor current in inductor 100.

Referring to FIG. 5A, circuit operation as a boost regulator is now described. When configured as a boost regulator, capacitor 38 is coupled to $V_{OUT}$ and capacitor 36 is coupled to $V_{IN}$. When switching transistor 31 is ON and switching transistor 32 is OFF, current flows from $V_{IN}$ through inductor 33, inductor 51, and transistor 31 to $V_{OUT}$. When transistor 31 is turned OFF by control circuit 34, current continues to flow in inductor 51 in the same direction, but the inductor current is redirected through the body diode of transistor 31 from its body region to its drain at $V_{IN}$. There may be a brief dead time introduced by circuitry within control circuit 34 before transistor 32 turns ON to prevent cross conduction through transistors 31 and 32. During the dead time, transistors 31 and 32 are both OFF.

When the dead time ends, transistor 32 turns ON and current now flows from node 53 through inductor 52 and transistor 32 to ground. The inductance of inductor 52 and the magnitude of the positive voltage at node 53 determine the rate of current rise in transistor 32 (according to the equation: di/dt=V/L). The current through inductor 52 increases after transistor 32 turns ON. When the current through inductor 52 rises to the point that it equals the current through main inductor 33, the current through inductor 51 equals zero. After this point, the voltage at node 53 falls. However, the body diode of transistor 31 is not commutated at this time and does not block reverse current flow through it.

The voltage between $V_{OUT}$ at capacitor 38 and node 53 is imposed across inductor 51. The voltage at node 53 is now near ground, and reverse recovery current (i.e., from $V_{OUT}$ to ground) now flows through the body diode of transistor 31, inductors 51 and 52, and transistor 32. The reverse recovery current removes charge carriers from transistor 31 so that its body diode commutates. The inductance of inductors 51 and 52 control the rate of increase of reverse recovery current in inductor 51. Inductors 51 and 52 reduce the rate of increase in the reverse recovery current, which promotes a more favorable redistribution of charge carriers in transistor 31. This reduces localized depletion of charge carriers in transistor 31, substantially reducing the undesirable avalanche effects discussed above.

As the reverse recovery current in inductor 51 increases, minority carriers in the body diode PN junction depletion region in transistor 31 are removed and the depletion region widens. Eventually, the body diode of transistor 31 commutates and blocks reverse current flow. By reducing the rate of increase in the reverse recovery current, the charge profile of transistor 31 redistributes in such a way that the body diode of transistor 31 commutates at a lower reverse recovery current. Thus, inductor 51 significantly reduces the peak reverse recovery current associated with the commutation of the body diode of transistor 31, which substantially reduces the power dissipated by transistor 32. The overall efficiency of regulator 50 increases as a result of inductor 51.

Current continues to flow in inductor 51 after the body diode of transistor 31 commutates. Once the body diode commutates, the current in inductor 51 is supplied by recovery switcher 46 via diode 41. Diode 41 provides a path for the energy in inductor 51 to recovery switcher 46. Recovery switcher 46 is a switching regulator that moves the energy intercepted by inductor 51 to $V_{OUT}$ at capacitor 38, causing further power saving and higher efficiency.

Recovery switcher 46 has an input terminal 46A coupled to diode 41 and an output terminal 46B coupled to capacitor 38. Recovery switcher 46 has a low input impedance (e.g., zero), and a high output impedance (e.g., infinity). Recovery switcher 46 regulates its input voltage at the anode of diode 41 to a lower value than the voltage at ground. Recovery switcher 46 does not regulate is output voltage at capacitor 38. The voltage at capacitor 38 is determined by the output voltage of regulator 50 when operated as a boost regulator. When the current through inductor 51 ramps down to zero, diode 41 commutates.

Figure 5C:
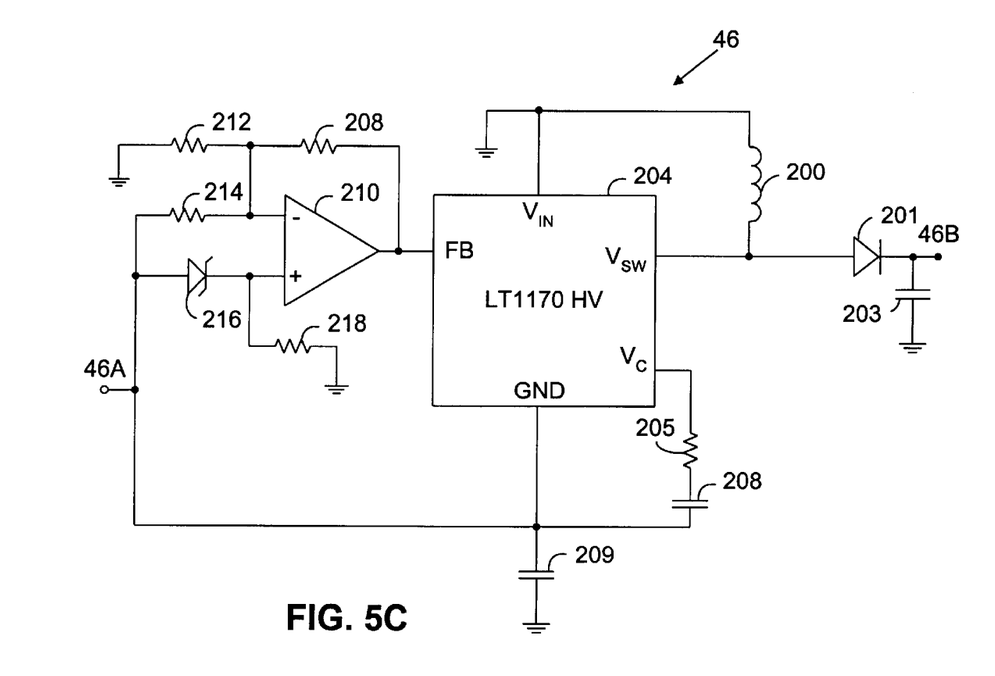
FIG. 5C is a schematic of another illustrative embodiment of a recovery switcher in accordance with the principles of the present invention.

Recovery switcher 46 may comprise one of many different topologies. A switching regulator 204 such as, for example, an LT1170 switcher is configured to act as a recovery switcher as shown in FIG. 5C. Details of the LT1170 circuit are shown and discussed in the 1994 LT1170 datasheet, which is hereby incorporated by reference herein in its entirety. The LT1170 is a non-synchronous switching regulator circuit that contains an internal switching transistor coupled between its $V_{SW}$ and GND pins. The switching transistor is turned ON and OFF by current-mode PWM control circuitry that includes a current amplifier that monitors the current through the switching transistor and an error amplifier which monitors the voltage at the FB pin. The $V_{SW}$ pin is coupled to inductor 200 and diode 201, and the GND pin is coupled to terminal 46A.

Operational amplifier 210 sets the voltage $V_{FB}$ at the FB pin in response to voltage $V_{46A}$ at terminal 46A, according to the values of the resistors 208, 212, 214, and 218 and voltage $V_{216}$ of reference voltage 216. Reference voltage 216 may be a zener diode, which sets a threshold voltage (e.g., 1.2 volts). When diode 41 of FIG. 5A is commutated, the voltage at terminal 46A is above the threshold set by reference 216 and the average inductor current in inductor 200 is zero. When forward current flows through diode 41, the voltage at terminal 46A (e.g., -7 volts) drops slightly (e.g., by a few millivolts) below the threshold voltage set by reference 216, causing $V_{FB}$ to increase with respect to the GND pin of switching regulator 204 so that the inductor current threshold set by switching regulator 204 increases above zero and the current in inductor 200 ramps up. When the switching transistor in circuit 204 turns OFF in each switching cycle, the voltage at $V_{SW}$ rises a diode 201 drop above terminal 46B. Current is now supplied through diode 201 to $V_{OUT}$ at capacitor 38 which is coupled to terminal 46B.

Figure 6:
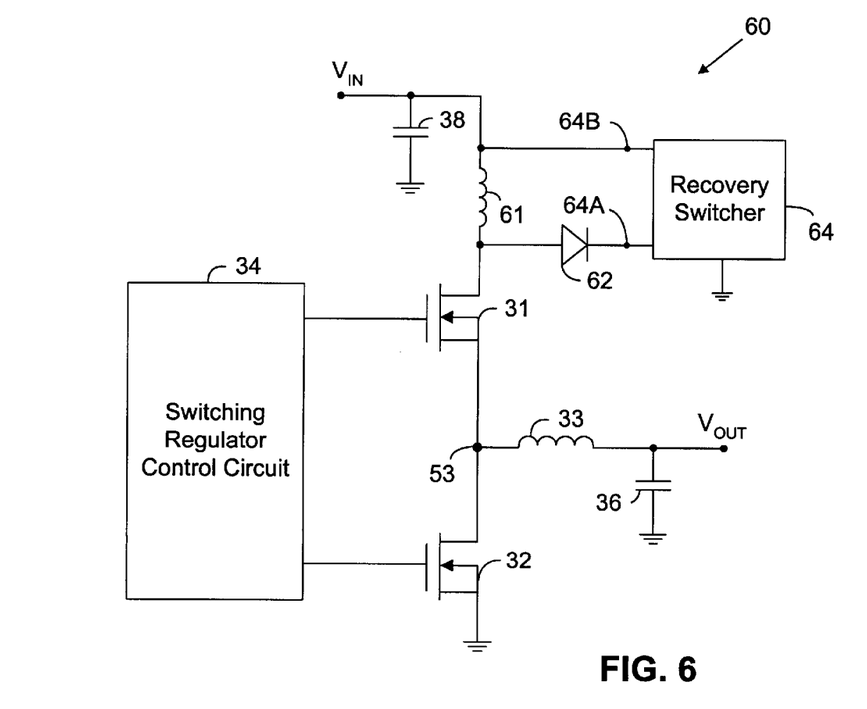
FIGS. 6, 7 and 8 are schematics of further illustrative embodiments of synchronous switching regulators in accordance with the principles of the present invention.

A further embodiment of switching regulators of the present invention is shown in FIG. 6. Switching 60 in FIG.

6 is a buck synchronous switching regulator circuit. Regulator 60 includes switching MOSFETs 31 and 32, main inductor 33, capacitor 36 coupled to $V_{OUT}$, capacitor 38 coupled to $V_{IN}$, switching regulator control circuit 34, inductor 61, diode 62, and recovery switcher 64. In buck regulator 60, current may flow through the body diode of transistor 32 when transistor 32 turns OFF. Inductor 61 has been added to reduce the rate of increase in the reverse recovery current to reduce the peak reverse recovery current and thereby reduce power dissipation in transistor 31. Alternatively, inductor 61 may comprise a winding in a transformer or choke coil.

When switching transistor 31 is OFF and switching transistor 32 is ON, current flows from ground through transistor 32 and inductor 33 to $V_{OUT}$. When transistor 32 turns OFF, current begins to flow from ground through the body diode of transistor 32 to inductor 33 during the dead time. When transistor 31 turns ON, current now flows from $V_{IN}$ at capacitor 38 through inductor 61 and transistor 31. The inductance of inductor 61 and the magnitude of the voltage on capacitor 38 determine the rate of current rise in transistor 31 (according to the equation: di/dt=V/L).

The current through inductor 61 increases after transistor 31 turns ON. When the current through inductor 61 rises to the point that it equals the current through main inductor 33, the current through the body diode of transistor 32 equals zero. After this point, the voltage at node 53 rises. However, the body diode of transistor 32 is not yet commutated and does not block reverse current flow. The voltage at node 53 is now positive, and reverse recovery current (i.e., from $V_{IN}$ to ground) flows through inductor 61, transistor 31, and the body diode of transistor 32. Inductor 61 reduces the rate of increase in the reverse recovery current so that charge carriers redistribute within transistor 32 in a way that reduces localized carrier depletion and the undesirable avalanche effects discussed above. The inductance value of inductor 61 is selected so that the charge carrier distribution within the transistor 32 body diode is redistributed in a way that reduces avalanche effects.

Eventually, the body diode of transistor 32 commutates and blocks reverse current flow. By reducing the rate of increase in the reverse recovery current, inductor 61 significantly reduces the peak reverse recovery current at the time of commutation of the body diode of transistor 32, which substantially reduces the power dissipated by transistor 31. The overall efficiency of regulator 50 increases as a result of inductor 61.

Output current continues to flows through inductors 61 and 33 to $V_{OUT}$ when the body diode of transistor 32 commutates. However, the current in inductor 61 is greater than the current in inductor 33. This difference in current flows through catch diode 62 and into recovery switcher 64. Once the magnitude of the current in inductor 61 reduces to the current in inductor 33, diode 62 commutates.

Recovery switcher 64 is a switching regulator that transfers the excess energy from inductor 61 back to $V_{IN}$ causing further power saving and higher efficiency. Recovery switcher 64 may comprise one of many different topologies. Recovery switcher 64 may comprise recovery switcher 44 shown in FIG. 5B, where terminal 64B is coupled to terminal 44B and terminal 64A is coupled to terminal 44A. When the excess energy due to the reverse recovery current in inductor 61 is transferred into input capacitor 38, diode 62 commutates.

Recovery switcher 64 has an input terminal 64A coupled to diode 62 and an output terminal 64B coupled to capacitor 38. Capacitor 38 is coupled to the input voltage source of regulator 60. Recovery switcher 64 has a low input impedance and a high output impedance. Recovery switcher 64 regulates its input voltage at the cathode of diode 62 to a value higher than the voltage on capacitor 38. Recovery switcher 64 does not regulate its output voltage at capacitor 38. The voltage at capacitor 38 is determined by the input voltage source of regulator 60.

Figure 7:
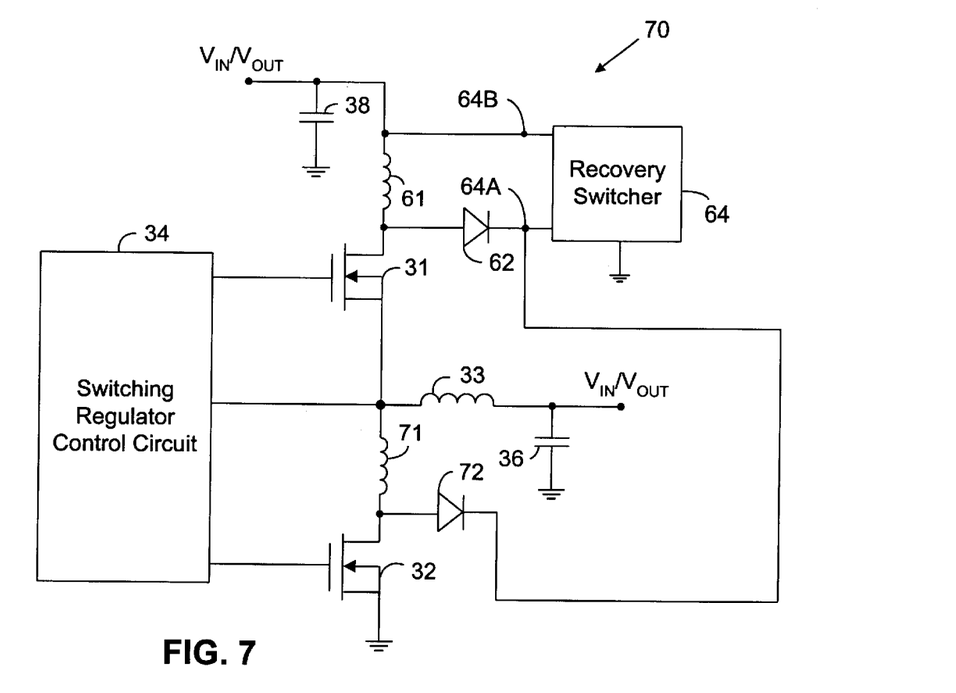

A further embodiment of switching transistors of the present invention is shown in FIG. 7. Synchronous switching regulator 70 in FIG. 7 includes n-channel switching MOSFETs 31 and 32, control circuit 34, main inductor 33, capacitors 38 and 36, inductors 61 and 71, diodes 62 and 72, and recovery switcher 64. Switching regulator 70 may be operated as a buck or boost regulator. Inductor 61, diode 62, and recovery switcher 64 operate as discussed above with respect to FIG. 6 when regulator is configured as a buck regulator.

When regulator 70 is configured as a boost regulator, inductor 71 reduces the rate of increase of reverse recovery current in the body diode of transistor 31 as is now discussed. Inductor 71 may be a winding in a transformer or choke coil. When transistor 31 is ON, transistor 32 is OFF and current flows from $V_{IN}$ at capacitor 36 through transistor 31 to $V_{OUT}$ at capacitor 38. When transistor 31 turns OFF, current flows through the body diode of transistor 31 to $V_{OUT}$ during the dead time. When transistor 32 subsequently turns ON, a current now flows through inductor 71 and transistor 32 to ground. The current through inductor 71 and transistor 32 ramps up and eventually equals the total current in main inductor 33. When this happens, the current in the body diode of transistor 31 equals zero, but the body diode has not yet commutated.

Subsequently, reverse recovery current begins to flow from $V_{OUT}$ through inductor 61, the body diode of transistor 31, inductor 71, and transistor 32 to ground. Inductors 61 and 71 slow the rate of increase of the reverse recovery current to reduce avalanche effects in transistor 31. Inductors 61 and 71 reduce the peak reverse recovery current at the time of commutation of the body diode of transistor 31, thereby reducing the power dissipated by transistor 32.

When the body diode in transistor 31 commutates, the excess energy from the reverse recovery current intercepted by inductor 71 flows through diode 72 to recovery switcher 64. Input terminal 64A of recovery switcher 64 is coupled to the cathode of diode 72. The excess energy from the reverse recovery current intercepted by inductor 61 flows through diode 62 to recovery switcher 64. Recovery switcher 64 then transfers that excess energy back to $V_{OUT}$ at capacitor 38. When the excess energy stored in inductor 71 has been transferred into recovery switcher 64, diode 72 commutates. When the excess energy stored by inductor 61 has been transferred into recovery switcher 64, diode 62 also commutates.

Figure 8:
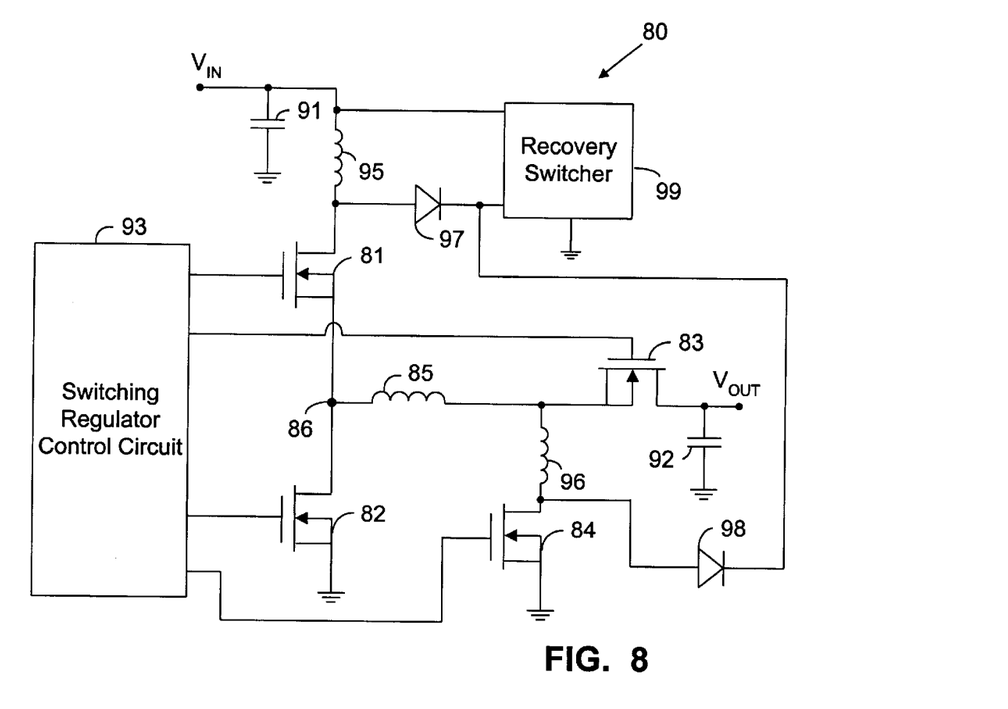

Buck-boost synchronous switching regulator 80 shown in FIG. 8 is a further embodiment of the present invention. Switching regulator 80 includes switching transistors 81–84, main inductor 85, input capacitor 91, output capacitor 92, inductors 95 and 96, and control circuit 93 which controls the ON and OFF switching of transistors 81–84. Switching transistors 81–84 are N-channel MOSFETs. Transistors 81 and 84 are always ON at the same time, and transistors 82 and 83 are always ON at the same time. Control circuit 93 switches transistors 81 and 84 out of phase with transistors 82 and 83, with a brief dead time. The input voltage $V_{IN}$ may be higher or lower than the output voltage $V_{OUT}$.

Inductor 95 coupled between $V_{IN}$ and transistor 81 reduces the peak reverse recovery current associated with the commutation of the body diode of transistor 82 and thereby reduces power dissipation in transistor 81 as discussed above with respect to inductor 61 in FIG. 6. When the body diode within transistor 82 commutates, current flows through diode 97 into recovery switcher 99 as discussed above with respect to diode 62 and recovery switcher 64 in FIG. 6. Inductor 96 coupled between transistor 84 and inductor 85 reduces the peak reverse recovery current associated with the commutation of the body diode of transistor 83 and thereby reduces power dissipation in transistor 84, as discussed above with respect to inductor 71 in FIG. 7. When the body diode of transistor 83 commutates, current flows through diode 98 to recovery switcher 99 as discussed above with respect to diode 72 and recovery switcher 64 in FIG. 7.

Persons skilled in the art further will recognize that the circuitry of the present invention may be implemented using circuit configurations other than those shown and discussed above. For example, n-channel MOSFETs 31 and 32 in FIGS. 5A–7 may be replaced with p-channel MOSFETs. Higher efficiency and faster turn OFF time may be achieved in p-channel transistors sing the circuitry and methods of the present invention discussed above. Also, the circuitry and methods of the present invention may be implemented in SEPIC regulators and fly-back regulators. All such modifications are within the scope of the present invention, which is limited only by the claims which follow.

What is claimed is:

1. A synchronous switching regulator circuit having an input capacitor and an output capacitor, comprising:
   first and second switching transistors coupled together and being synchronously switched out of phase by a synchronous switching regulator control circuit;
   a main inductor coupled to the first switching transistor; and
   a second inductor coupled in a commutation path of a first body diode of the first switching transistor or a second body diode of the second switching transistor that reduces a reverse recovery current in the first or the second body diode.

2. The synchronous switching regulator of claim 1 wherein the second inductor is coupled between the first or the second switching transistor and the main inductor.

3. The synchronous switching regulator of claim 1 wherein the second inductor is coupled between the input capacitor and the first or the second switching transistor.

4. The synchronous switching regulator of claim 1 further comprising:
   a diode coupled to the second inductor; and
   a recovery switcher coupled to the diode and the input capacitor.

5. The synchronous switching regulator of claim 1 wherein the second inductor is coupled in the commutation path of the second body diode and reduces the reverse recovery current in the second body diode; and further comprising:
   a third inductor coupled in the commutation path of the first body diode that reduces a reverse recovery current in the first body diode.

6. The synchronous switching regulator of claim 5 further comprising:
   a diode coupled to the third inductor; and
   a recovery switcher coupled to the diode and the input capacitor.

7. The synchronous switching regulator of claim 6 wherein the recovery switcher is a voltage mode non-synchronous switching regulator.

8. The synchronous switching regulator of claim 5 further comprising:
   a diode coupled to the second inductor; and
   a recovery switcher coupled to the diode and the input capacitor.

9. The synchronous switching regulator of claim 1 further comprising:
   a third inductor coupled to the first switching transistor that reduces a reverse recovery current in the second body diode.

10. The synchronous switching regulator of claim 1 wherein the regulator is a buck-boost regulator with third and fourth switching transistors coupled together and to the main inductor.

11. The synchronous switching regulator of claim 10 further comprising:
    a third inductor coupled in a commutation path of a body diode of the third or the fourth switching transistor that reduces a reverse recovery current in the body diode of the third or the fourth switching transistor.

12. The synchronous switching regulator of claim 1 wherein the regulator is a buck regulator.

13. The synchronous switching regulator of claim 1 wherein the regulator is a boost regulator.

14. A method for operating a synchronous switching regulator having an input capacitor and an output capacitor, comprising:
    switching a first and second synchronous switching transistors out of phase with each other using a switching regulator control circuit to supply current to a load coupled to the output capacitor;
    coupling a first inductor to the first and second switching transistors; and
    coupling a second inductor in a commutation path of a body diode of the first or the second switching transistor that reduces a reverse recovery current in the body diode of the first or the second switching transistor.

15. The method of claim 14 wherein the second inductor is coupled in a commutation path of the body diode of the first switching transistor and reduces the reverse recovery current in the body diode of the first switching transistor.

16. The method of claim 15 further comprising:
    transferring energy stored in the second inductor to the input capacitor after the body diode in the first switching transistor commutates.

17. The method of claim 16 wherein:
    transferring energy stored in the second inductor to the input capacitor further comprises coupling a recovery switcher between the second inductor and the input capacitor.

18. The method of claim 15 further comprising:
    coupling a third inductor in the commutation path of the body diode of the second switching transistor to reduce a reverse recovery current in the body diode of the second switching transistor.

19. The method of claim 16 further comprising:
    transferring energy stored in the third inductor to the input capacitor after the body diode in the second switching transistor commutates.

20. The method of claim 19 wherein transferring energy stored in the third inductor to the input capacitor further comprises coupling a recovery switcher between the third inductor and the input capacitor.

21. The method of claim 14 wherein the second inductor is coupled between the first switching transistor and the input capacitor.

22. The method of claim 14 wherein the second inductor is coupled between the main inductor and the first switching transistor.

23. The method of claim 14 wherein the second inductor is coupled between the main inductor and the second switching transistor.

24. The method of claim 14 wherein the regulator is a buck-boost regulator and further comprising switching third and fourth synchronous switching transistors out of phase using the control circuit.

25. The method of claim 24 further comprising:
coupling a third inductor in a commutation path of a body diode of the third or the fourth switching transistor that reduces a reverse recovery current in the body diode of the third or the fourth switching transistor.

26. A synchronous switching regulator circuit having an input capacitor and an output capacitor, comprising:
means for synchronously switching first and second switching transistors out of phase with each other;
means for storing energy transferred from the input capacitor to the output capacitor; and
inductor means for reducing a reverse recovery current in a body diode of the first or the second switching transistor.

27. The synchronous switching regulator of claim 26 further comprising:
a diode coupled to the means for reducing the reverse recovery current; and
a recovery switcher coupled to the diode and the input capacitor.

28. The synchronous switching regulator of claim 26 further comprising:
means for reducing a reverse recovery current in the body diode of the first switching transistor and the body diode of the second switching transistor.

29. The synchronous switching regulator of claim 28 further comprising:
a diode coupled to the means for reducing the reverse recovery current in the body diode of the first switching transistor and the body diode of the second switching transistor; and
a recovery switcher coupled to the diode and the input capacitor.

30. The synchronous switching regulator of claim 26 wherein the switching regulator is a buck-boost regulator with third and fourth switch transistors coupled together and to the means for storing energy.

31. The synchronous switching regulator of claim 30 further comprising:
means for reducing a reverse recovery current in the body diode of the third or the fourth switching transistor.

32. The synchronous switching regulator of claim 26 wherein the regulator is a buck regulator.

33. The synchronous switching regulator of claim 26 wherein the regulator is a boost regulator.

34. The synchronous switching regulator of claim 26 wherein the inductor means for reducing the reverse recovery current increases the power efficiency of the synchronous switching regulator.

35. The synchronous switching regulator of claim 26 wherein the means for storing energy transferred from the input capacitor to the output capacitor comprises an inductor.

36. A switching regulator circuit having an input node, an output node, and a ground node, the circuit comprising:
a first transistor;
a second transistor;
a first inductor, wherein the first transistor, the second transistor, and the first inductor are coupled in series between the input node and the ground node;
a second inductor coupled between the first transistor and the output node; and
a control circuit for switching the first and second transistors out of phase with each other.

37. The switching regulator circuit of claim 36 further comprising a third inductor coupled in series with the first and second transistors and the first inductor between the input node and the ground node.

* * * * *

UNITED STATES PATENT AND TRADEMARK OFFICE
CERTIFICATE OF CORRECTION

PATENT NO. : 6,504,351 B2  Page 1 of 1
DATED : February 20, 2001
INVENTOR(S) : Dale R. Eager and John L. Seago It is certified that error appears in the above-identified patent and that said Letters Patent is hereby corrected as shown below:

<u>Title page,</u>
Item [56], References Cited, change "5,365,188" to -- 5,365,118 --.

Signed and Sealed this

Twenty-eighth Day of October, 2003

JAMES E. ROGAN
*Director of the United States Patent and Trademark Office*